(No Model.)
F. F. LANDIS.
RETHRASHER AND ELEVATOR FOR TAILINGS.
No. 551,500. Patented Dec. 17, 1895.
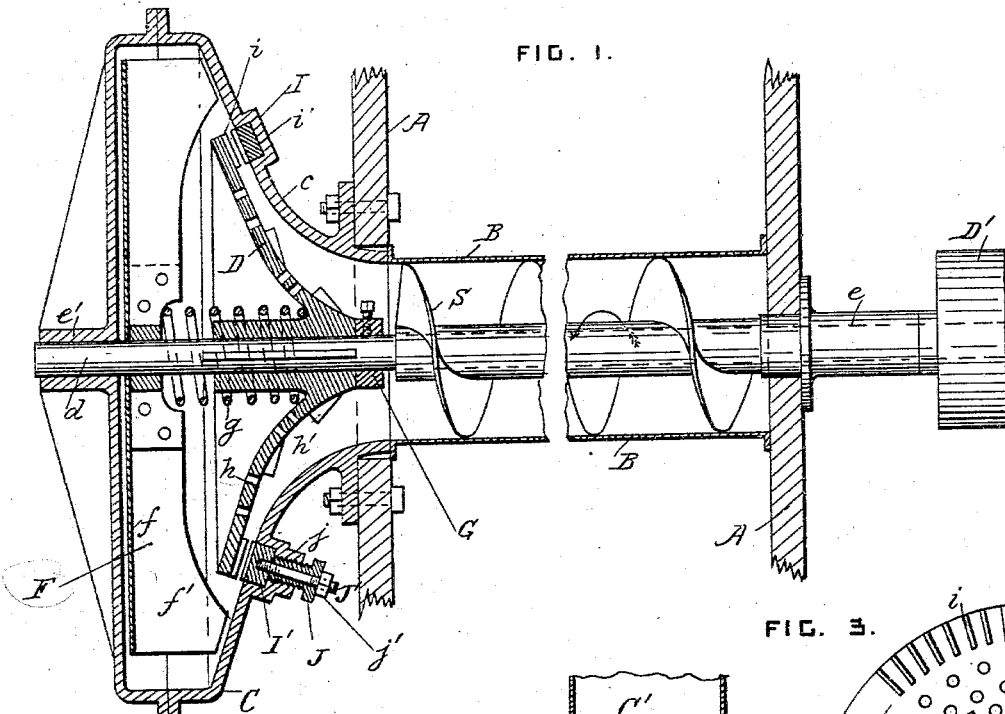
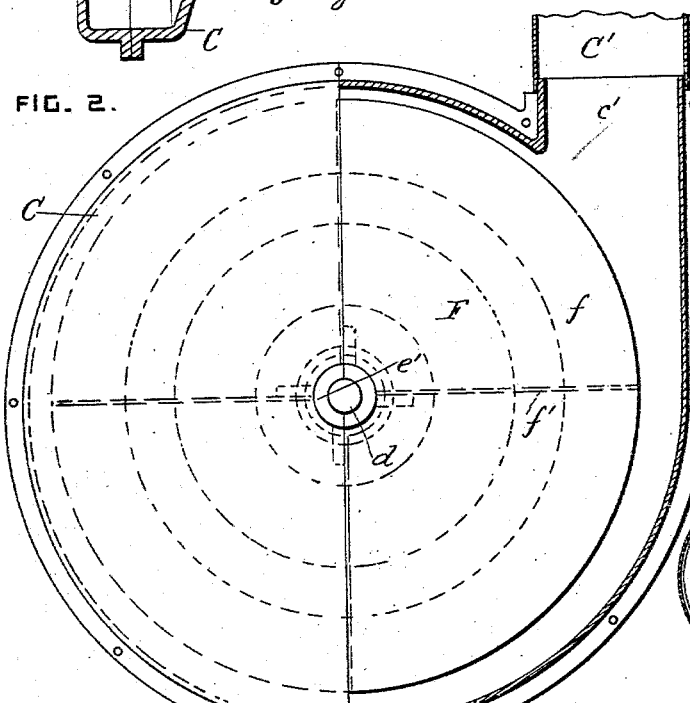
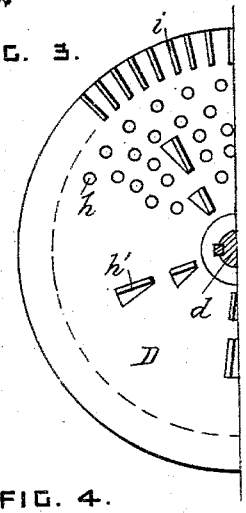
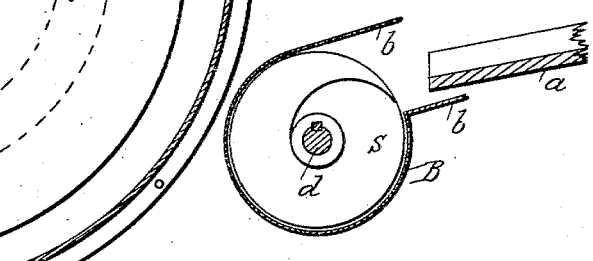
Witnesses
Inventor
Frank F. Landis.
By Attorney Herbert W. Jenner.

UNITED STATES PATENT OFFICE.

FRANK F. LANDIS, OF WAYNESBOROUGH, PENNSYLVANIA.

RETHRASHER AND ELEVATOR FOR TAILINGS.

SPECIFICATION forming part of Letters Patent No. 551,500, dated December 17, 1895.

Application filed August 28, 1895. Serial No. 560,741. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Rethrashers and Elevators for Tailings; and I do hereby declare the following to be a full, clear, and exact description of the invention, such as will enable others skilled in the art to which it appertains to make and use the same.

This invention relates to devices for rethrashing the tailings of a thrashing-machine, and then elevating them above the cleaning mechanism of the machine; and it consists in the novel construction and combination of the parts hereinafter fully described and claimed.

In the drawings, Figure 1 is a longitudinal section through the rethrashing mechanism. Fig. 2 is an end view of the same with part of the discharger-casing removed. Fig. 3 is a detail rear view of the rethrashing-disk. Fig. 4 is a cross-section through the conveyer. Fig. 5 is a detail view of the teeth on the rethrashing disk and ring.

A are portions of the casing of a thrashing-machine of any approved construction.

B is a tailings-spout arranged crosswise of the machine-casing. This spout is preferably cylindrical, and is provided with lips $b$ for receiving the tailings from a chute $a$ or any other equivalent part of the thrashing-machine.

C is the discharger-casing, preferably formed in two parts and secured to one side of the casing A. One side of the casing C has a conical or flaring chamber $c$ for the rethrashing-disk to run in. The discharger-casing is also provided with a delivery-passage $c'$ to which the elevator-pipe C'' is connected.

D is a conical rethrashing-disk splined on a shaft $d$ which is journaled in suitable bearings. The shaft $d$ preferably extends through the tailings-spout and is supported in a bearing $e$ on the side of the machine away from the discharger and in a bearing $e'$ on the discharger-casing.

D' is a wheel or pulley by which the shaft $d$ is revolved from any convenient shaft and pulley of the thrashing-machine.

S is a spiral conveyer secured on the shaft $d$ inside the spout B.

F is the pneumatic discharger or elevator provided with a hub, a disk $f$, and radial arms $f'$. The discharger is secured on the shaft $d$ inside the discharger-casing.

G is a stop or collar secured on the shaft $d$ at the entrance to the chamber $c$, and $g$ is a spring interposed between the discharger and the rethrashing-disk for pressing the said disk against the collar G.

The rethrashing-disk D is provided with holes $h$ in its conical surface, and teeth $h'$ at intervals between the holes. The holes are of such a size that nothing larger than grains of wheat will pass through them freely, and are of such an area collectively as to admit as much air into the discharger-casing as the discharger can dispose of. A series of teeth $i$ is formed at the periphery of the disk D.

I is a rethrashing-ring provided with a series of teeth $i'$ on its face. The teeth $i$ and $i'$ are preferably beveled in opposed directions, and the disk D is revolved so that the beveled sides of the teeth on the disk approach the beveled sides of the teeth on the ring.

The ring I is of the same diameter as the disk D, and is let into a channel I' in the flaring side of the chamber $c$. The ring I is provided with means for adjusting it with respect to the rethrashing-disk.

J are plugs screwed into bosses $j$ behind the channel I', three plugs being preferably provided.

J' are studs passing through holes in the plugs J and screwed into the ring I. Locknuts $j'$ are screwed on the projecting ends of the studs for securing the ring after the plugs have been screwed in or out to adjust its position.

The elevator-pipe is connected to the thrashing-machine at any convenient point above its cleaning mechanism.

The operation of the rethrashing mechanism is as follows: The tailings, which consist chiefly of broken heads with the grain still in them, and whitecaps slide into the tailings-spout and are conducted by the conveyer into the chamber $c$. The tailings are whirled around in the chamber $c$ and are flung by centrifugal force to the periphery of the disk D. The discharger draws the dust and small particles through the holes in the disk, and the tailings are rethrashed by being rubbed between the disk and the side of the rethrashing-chamber and between the teeth $i$ and $i'$. The teeth knock the grains out of the broken heads and rub the outer coverings off the whitecaps. The spring behind the rethrashing-disk permits it to move laterally to a slight extent away from the ring I whenever a lump or bunch of rubbish in the tailings comes between the disk and ring, and the spring restores the disk to its normal position as soon as the lump has passed. The discharger whirls around the rethrashed tailings in the discharger-casing and forcibly projects them up the elevator-pipe. The blast of air from the discharger carries the rethrashed tailings through the elevator-pipe into the thrashing-machine above the cleaning devices, or wherever the said elevator-pipe is connected.

What I claim is—

1. The combination, with a conveyer spout, and a casing secured over one end thereof and provided with a conical portion and a delivery passage at its periphery; of a shaft passing through the said spout and casing and provided with means for revolving it, a spiral conveyer secured on the shaft inside the spout, a pneumatic discharger secured on the shaft inside the said casing, and a spring-pressed rethrashing disk splined on the shaft between the said conveyer and discharger, substantially as set forth.

2. The combination, with a casing provided with a conical portion at one side, and a delivery passage at its periphery; of a shaft passing through the said casing and provided with a stop and means for revolving it, a pneumatic discharger secured on the shaft inside the casing, a conical rethrashing disk provided with perforations and teeth and splined on the shaft in the conical portion of the casing, and a spring interposed between the said disk and discharger and operating to press the disk against the stop, substantially as set forth.

3. In a rethrasher for tailings, the combination, with a chamber provided with an annular channel, a ring provided with teeth and let into the said channel, adjusting plugs screwed through the side of the chamber behind the ring, and studs provided with nuts and operatively connecting the said ring with the plugs; of a revoluble rethrashing disk having teeth at its periphery opposite the aforesaid teeth on the ring, substantially as set forth.

4. The combination, with a discharger casing having a rethrashing chamber at one side, of a shaft provided with a stop, a discharger secured on the said shaft, a rethrashing disk splined on the said shaft, and a spring interposed between the said discharger and disk and operating to press the disk against the said stop, substantially as set forth.

In testimony whereof I affix my signature in presence of two witnesses.

FRANK F. LANDIS.

Witnesses:
T. S. CUNNINGHAM,
M. F. NEWMAN.